May 1, 1956 F. W. LEE 2,743,785
APPARATUS FOR MAKING SEISMIC SURVEYS
Filed Aug. 20, 1951 3 Sheets-Sheet 1
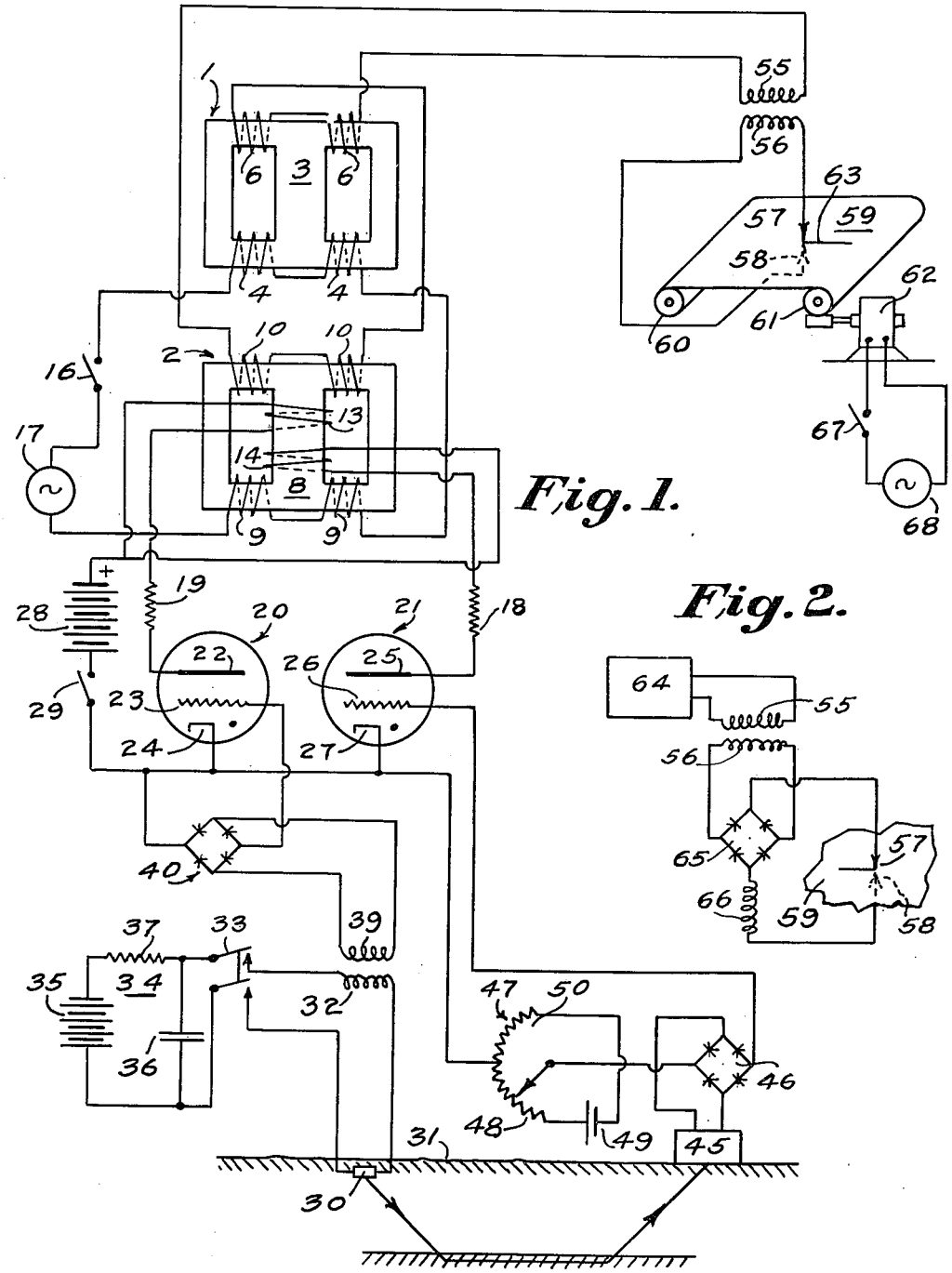
INVENTOR
FREDERICK W. LEE
BY H. L. Godfrey
ATTORNEY May 1, 1956 F. W. LEE 2,743,785
APPARATUS FOR MAKING SEISMIC SURVEYS
Filed Aug. 20, 1951 3 Sheets-Sheet 2

INVENTOR
FREDERICK W. LEE
BY H. L. Godfrey
ATTORNEY

May 1, 1956  F. W. LEE  2,743,785
APPARATUS FOR MAKING SEISMIC SURVEYS
Filed Aug. 20, 1951  3 Sheets-Sheet 3

INVENTOR
FREDERICK W. LEE
BY H. L. Godfrey
ATTORNEY

United States Patent Office 2,743,785
Patented May 1, 1956

2,743,785

APPARATUS FOR MAKING SEISMIC SURVEYS

Frederick W. Lee, Owings Mills, Md.

Application August 20, 1951, Serial No. 242,775

4 Claims. (Cl. 181—.5)

(Granted under Title 35, U. S. Code (1952), sec. 266)

The invention described herein may be manufactured and used by or for the Government of the United States for governmental purposes without the payment to me of any royalty thereon in accordance with the provisions of the Act of April 30, 1928 (Ch. 460, 45 stat. L. 467).

This invention relates to apparatus for and methods of making seismic surveys and more particularly to apparatus for and methods of recording the time taken for sonic waves to travel from one point to another through the earth.

In making seismic surveys, an explosive charge can be detonated at one point on, or in, the earth's surface, producing sonic waves which travel through the earth. The arrival of the sonic waves at a second point on, or in, the earth's surface can be detected and the transit time recorded. This transit time is indicative of the geologic structure of the earth in the vicinity of, and between, the point of explosion and the point of detection.

In making seismic surveys, the distances which the sonic waves travel through the earth are necessarily small because of practical considerations in placing the explosive charge and the detectors. Since the speeds range from 700 to 20,000 feet per second, the transit time is of small duration. Time is measured in units of one thousandth of a second (milliseconds). A sonic wave will travel five feet in water and twenty feet in rock in one millisecond. Because of these short observation intervals, it is not possible to use timing devices which rely on mechanical or electro-mechanical components, such as magnetic relays. Only electronic circuits are practicable for this use.

A cathode ray oscillograph may be used as the recording means, but this is an expensive method and usually requires specially prepared photographic papers and the fixers and developers incident thereto, as well as a dark room.

One of the objects of this invention is to provide an improved method of, and means for, making seismic surveys.

Another object of this invention is to provide an electronic recording system using an electrical marking means.

Another object of this invention is to provide a recording system which is relatively inexpensive, and which provides a record that is immediately available for use.

Another object of this invention is to provide a system for recording seismic time intervals which can be immediately evaluated wthout the need for special computing facilities.

Other objects of this invention will become apparent to those skilled in the art from the following specification taken in connection with the accompanying drawing in which:

Figure 1 is a schematic diagram showing one embodiment of this invention.

Figure 2 is a schematic diagram showing the invention of Figure 1 using a modified marking means.

Figure 3:
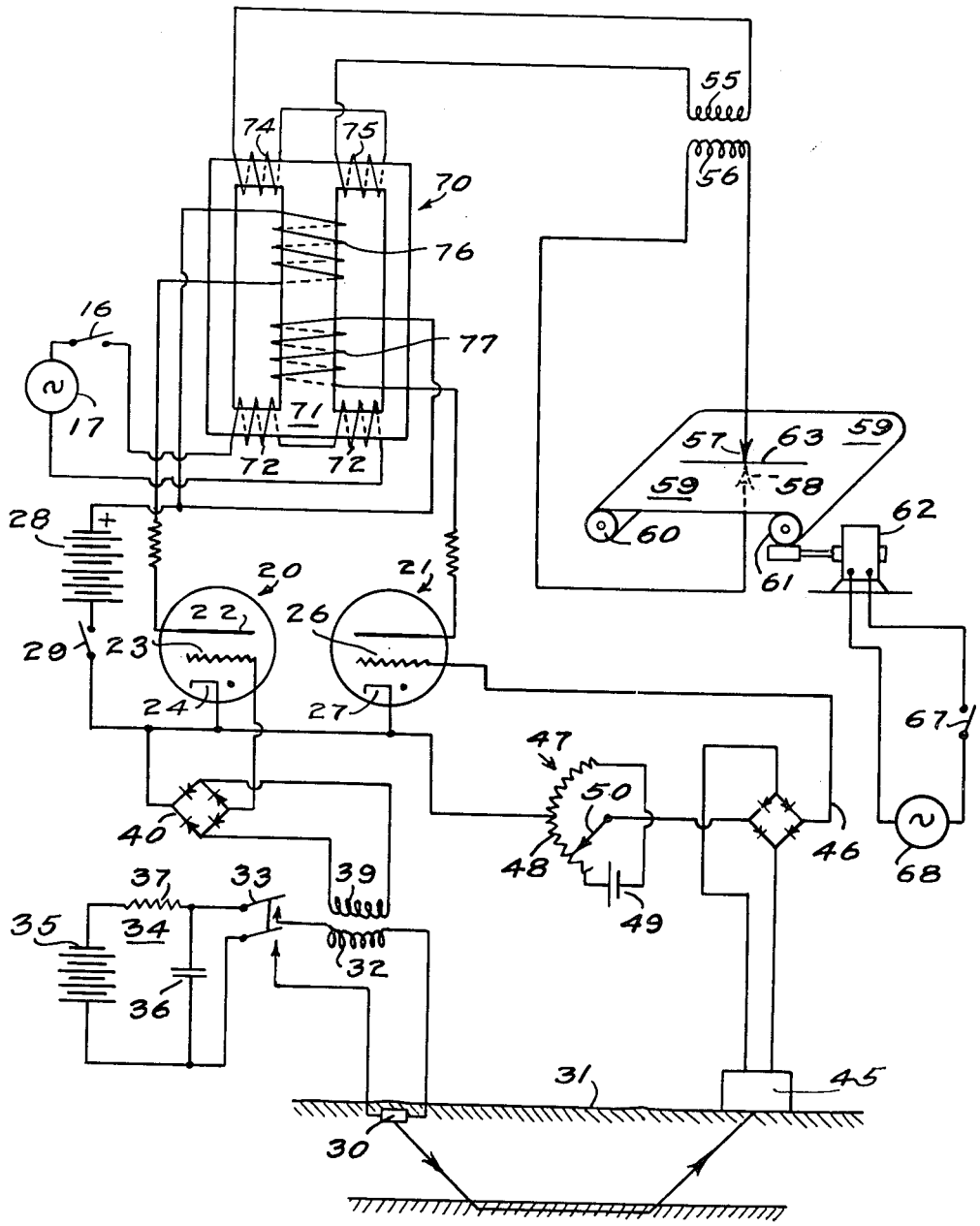
Figure 3 is a schematic diagram showing an alternate form of this invention.

In the embodiment of the invention shown in Figure 1, there are provided two transformers 1 and 2 which are substantially identical in their magnetic characteristics. Transformer 2 must be arranged to operate near its point of magnetic saturation. Transformer 1 does not need to operate near this point. Transformer 1 has a primary winding 4 and a secondary winding 6 on its magnetic core 3. Transformer 2 has a primary winding 9 and a secondary winding 10 wound on its magnetic core 8. Primary winding 4 of transformer 1 has the same number of turns as primary winding 9 of transformer 2. Secondary winding 6 of transformer 1 has the same number of turns as secondary winding 10 of transformer 2. Transformer 2 additionally has two saturation control windings 13 and 14 respectively.

Primary winding 9 of transformer 2 is connected in series with primary winding 4 of transformer 1, with source 17 of alternating electrical potential and with switch 16.

Secondary winding 6 of transformer 1 is connected in phase opposition, and in series with, secondary winding 10 of transformer 2 and also in series with an output coupling coil 55.

There are also provided in the apparatus shown in Figure 1, two gas filled triodes 20 and 21 respectively. Triode 20 has a plate 22, a control grid 23, and a cathode 24. Triode 21 has an anode 25, a control grid 26, and a cathode 27. The plate 22 of triode 20 is connected through a resistor 19, saturation control winding 13 of transformer 2, and plate battery 28 to cathode 24. Anode 25 of triode 21 is connected through resistor 18 and saturation control winding 14 of transformer 2 through plate battery 28 to cathode 27. Resistors 18 and 19 are ballast resistors and are provided to equalize the current in saturation control windings 13 and 14. Battery 28 is provided with a switch 29.

Control grid 23 of triode 20 is connected through full-wave rectifier bridge 40 to cathode 24 of triode 20. Full-wave rectifier bridge 40 is also connected to coupling coil 39 which is closely coupled with coil 32. Coil 32 is connected in series with the detonator of explosive charge 30, with a single-throw double-pole switch 33, and with condenser 36 of detonating circuit 34. Detonating circuit 34 comprises battery 35 connected through resistor 37 to condenser 36.

Control grid 26 of triode 21 is connected through full-wave rectifier bridge 46 and threshold potential control circuit 47 to cathode 27 of triode 21. A detecting device 45 is also connected to full-wave rectifier bridge 46. Detector device 45 is any device suitable as a pick-up of seismic vibrations. It is electrical in character and is similar to a microphone and may operate on an electro-dynamic principle, a change of magnetic induction or may include the use of a piezo-electric crystal. In the threshold potential control circuit 47, a variable contactor 50 connected to the rectifier bridge 46 slides along a resistor 48 which is shunted across a battery 49. The midpoint of resistor 48 is connected to cathode 27 of triode 21. Explosive charge 30 and detecting device 45 may be placed on, or buried below, the earth's surface 31.

The output coil 55 which is connected in series with secondary winding 6 of transformer 1 and secondary winding 10 of transformer 2, oppositely phased, is closely coupled to a coil 56. One end of coil 56 is connected to a marking stylus 57, immediately under which passes a suitable recording paper 59. The other end of coil 56 is connected to a conducting member 58 under recording paper 59 at a point which is directly below the stylus 57. A roll of recording paper 59 is pulled from roller 60 and onto roller 61. Roller 61 is rotated by a motor 62 through suitable gearing. Motor 62 is operated by a source of potential 68 through switch 67.

In the operation of the apparatus shown in Figure 1, the switch 16 is closed and source 17 of alternating potential causes a current to flow through the primary 9 of transformer 2 and through the primary 4 of transformer 1. This primary current flow causes an alternating magnetic flux to flow in the core 3 of transformer 1 and the core 8 of transformer 2. When there is no current flowing through the magnetic saturation control coils 13 and 14 of transformer 2, the voltages induced in the secondary winding 6 of transformer 1 and the secondary winding 10 of transformer 2 are equal. Since secondary winding 6 is connected in phase opposition and in series with secondary winding 10, the voltages are equal and opposite and no current flows through the output coil 55 with which secondary winding 6 and secondary winding 10 are connected in series.

Switch 29 is closed providing plate potential for tubes 20 and 21. Switch 67 is closed, causing motor 62 to move paper recording strip 59.

In the detonating circuit 34, the condenser 36 is charged through resistor 37 by battery 35. When switch 33 is momentarily closed, condenser 36 is discharged through coupling coil 32 and the detonating device associated with explosive charge 30. The discharge of condenser 36 detonates the explosive charge 30 and causes a sonic wave to be propagated through the earth. The discharge of condenser 36 not only detonates the explosive charge 30, but also causes a current to flow through coil 32. The pulse of current that flows through coil 32, as a result of the discharge of condenser 36, induces a pulse of current to flow in coil 39. This pulse in coil 39 is rectified by the bridge 40 and places a positive pulse on the grid 23 of the gas filled triode 20, causing this tube to strike and allow a current to flow in its plate circuit. The current thus caused to flow in the plate circuit of triode 20 flows through saturation control coil 13 of the transformer 2 and causes an increased magnetic flux to flow through the core 8 of this transformer so that the flux in the core 8 approaches the saturation point.

Since the core 8 is now nearly saturated, the alternating current flowing in the primary coils 9 no longer induces the former relatively high voltage in the secondary coils 10 of transformer 2. The full voltage still induced in secondary winding 6 of transformer 1 is now no longer balanced out by the lower voltage induced in secondary coil 10 of transformer 2, and as a result, a current flows through output coupling coil 55. This in turn causes a current to flow in coupling coil 56, and a high voltage is induced in coupling coil 56, which results in a spark passing through the paper between the stylus 57 and the backing member 58, causing the paper 59 to be marked thereby.

If the paper 59 is plain paper, it may be burned, scorched or perforated by the spark passing between the stylus 57 and the member 58. Alternatively, the paper 59 may be a well known, paraffin coated paper from which the paraffin coat is removed by the spark. If desired, the coupling coil 55—56 may be replaced by a device in the nature of a spark coil to produce a high frequency, high potential spark.

When gas-filled triode 20 strikes, its grid 23 loses control, and its plate cathode circuit remains conducting and a continuous mark 63 is drawn as the motor 62 moves the paper 59 under the stylus 57. When the sonic wave initiated at the explosive charge 30 reaches the detecting device 45, an electrical pulse is generated thereby. This pulse passes through the rectifier bridge 46 and through the threshold potential control circuit 47 and is applied with the proper positive polarity to the grid 26 of the gas-filled triode 21, causing it to strike. The striking of tube 21 causes a plate current to flow through the saturation control coil 14 of transformer 2. Since the magnetic saturation control coil 14 is wound oppositely to the saturation control coil 13, the current now flowing through coil 14 counteracts the current already flowing through the coil 13 and restores the operation of transformer 2 to its original situation so that it again operates in an unsaturated manner.

A full voltage is now induced in the secondary coil 10 of transformer 2 which completely counter-balances the voltage induced in the secondary 6 of transformer 1 and prevents a current from flowing through the coil 55. A voltage is no longer induced in the coil 56 and no spark is produced at the stylus 57. The mark 63 thus ends abrutly when the detecting device 45 senses the arrival of the sonic wave. Since the motor 62 draws the paper 59 under the stylus 57 at a uniform speed, the length of the mark 63 is directly proportional to the transit time of the sonic wave from the explosive charge 30 to the sensing device 45.

The function of the threshold potential circuit 47 is to set a predetermined potential of the proper character on the grid of triode 21 so that this triode will operate within its proper range and will strike when the pulse from device 45 is applied to the grid 26.

Since the operating cycle is now completed, switches 16, 29, and 67 are opened. While the switches 16, 29, 33, and 67 may be opened and closed manually, it has been found desirable to operate them automatically as part of a master timing switch or "brain wheel" as it has been called. This timing device (not shown) may include a shaft rotated by a small motor and having cams to operate the switches 16, 29, 33, and 67. When the master timing motor is started, it first closes switches 16, 29 and 67 to start movement of the recording strip 59 and to energize the transformers 1 and 2 and tubes 20 and 21. The timing motor then momentarily closes switch 33 to fire the explosive and after allowing time for the explosion to be detected and recorded, opens switches 16, 29, and 67.

When spark recording is used as has been described in connection with Figure 1, the electrical source 17 is preferably of a high frequency of the order of 400 to 1,000 cycles per second. This will provide spark intervals of the order of 800 to 2,000 per second.

A carbon coated paper 59 may be used which requires a current concentration at the stylus 57 for marking, and in this case, lower frequencies can be used, if precautions are taken concerning the time interval in which the current passes through zero and does not mark. When a current concentration is required, the coils 55—56 will be in the nature of a step-down transformer. When carbon paper is used along with lower frequency, the interval during which the current passes through zero and does not mark can be bridged by an inductance or sustaining coil 66, as is shown in Figure 2. In Figure 2, the output coupling coil 55 corresponds to the output coupling coil 55 in Figure 1. In Figure 2, the component 64 to which the coupling coil 55 is connected includes a circuit identical with that shown in Figure 1 to which the coupling coil 55 in Figure 1 is connected. The component 64, therefore, in Figure 2 includes transformers 1 and 2, gas-filled triodes 20 and 21, and their associated circuits, including the control circuits which are connected to the detonating circuit and the sensing circuit. In Figure 2, the coupling coil 56 coupled to the output coil 55 is connected through a full-wave rectifier bridge 65 to an inductance or sustaining coil 66, so that all or part of the interval is bridged when the low frequency marking current passes through zero. The stylus 57 and the backing member 58 correspond exactly to the members 57 and 58 in Figure 1.

In Figure 3, there is shown a recording system generally similar to that shown in Figure 1. However, in Figure 3 one transformer 70 takes the place of the two transformers 1 and 2 in Figure 2. Transformer 70 has a primary winding 72 and two secondary windings 74 and 75 which have an equal number of turns. Transformer 70 also has saturation control windings 76 and 77. The primary winding 72 of transformer 70 is connected to a source 17 of alternating potential. The two secondary windings 74 and 75 of transformer 70 are connected in series in reverse phase, and are connected in series with the output coupling coil 55. Saturation control coil 76 is connected in series with the plate-cathode circuit of gas-filled triode tube 20 and plate battery 28. Magnetic saturation control coil 77 is connected in series with the plate-cathode circuit of gas-filled triode 21 and plate battery 28. The structure of the rest of Figure 3 has been already fully described in connection with Figure 2. The other elements of Figure 3 are identical with the similarly numbered elements in Figure 1 as to structure and function.

In operation, transformer 70 initially has equal and opposite voltages induced in secondary windings 74 and 75 with the result that these voltages balance out and no current flows through coupling coil 55. It will be noted that, in this condition, the flux caused by windings 72 will be in the same direction and will travel in the same direction around the outer branches of core 71. These fluxes, being equal and opposite, will not travel through the central branch of the core 71. When explosive charge 30 is detonated and the saturating current is applied through magnetic saturation control coil 76, the core 71 of transformer 70 is nearly saturated. This saturating flux travels in one direction through the central branch of core 71 and in opposite directions through the outer branches of core 71. The saturating flux will hence be in the same direction as the flux caused by one of the coils 72 and in the opposite direction to the flux caused by the other of the coils 72. The voltages induced in the secondary coils 74 and 75 will no longer be simultaneously equal. Under this saturating condition in one-half of the cycle, the voltage induced in winding 74 will be greater than that induced in winding 75, and in the other one-half cycle, the voltage induced in secondary coil 74 will be less than that induced in secondary coil 75. Under this saturating condition, the voltages induced in coils 74 and 75 are not simultaneously equal and a marking current will flow through the output coupling coil 55 and cause a mark to appear on the paper 59 as explained in connection with Figure 1.

When the detecting device 45 senses the arrival of the sonic wave initiated at the detonating device 30, the triode 21 in Figure 3 will strike, causing a current to flow through the saturation control coil 77 which will counterbalance the magneto-motive force provided by the coil 76 and, in effect, place the transformer 70 in its original unsaturated condition. When both triodes 20 and 21 are passing a plate current, the voltages induced in the secondary coils 74 and 75 will again be simultaneously equal and opposite. In this condition, no current will flow through the output coil 55 and no marking current will be applied to the stylus 57. The mark 63 on the paper 59 will be terminated.

Figure 4:
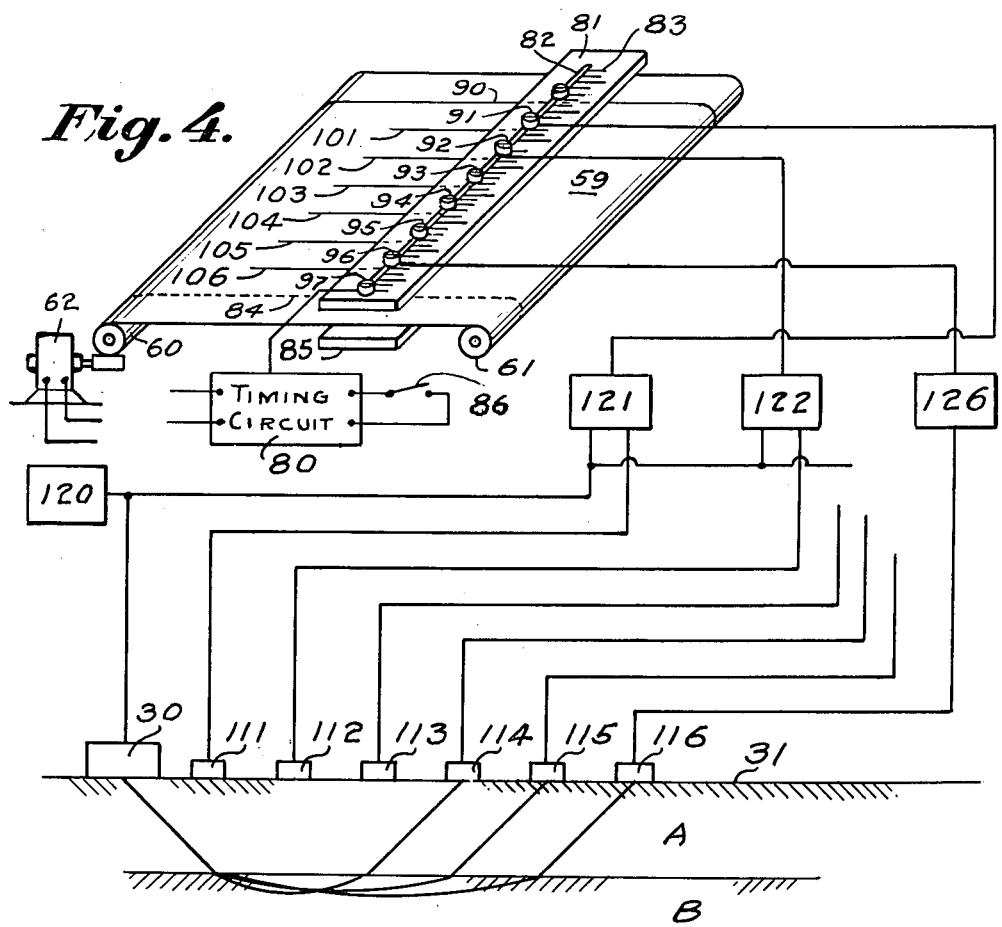
Figure 4 is partly in perspective and partly a block diagram showing a recording system embodying the principles of this invention as it would be used in the field incorporating a plurality of marking means.

Figure 4 shows a field application in which a large number of detecting devices are used. In Figure 4, there is one detonating device 30 which is fired by a detonating circuit 120 which includes a switch. There are a plurality of detecting devices 111—116, each of which is connected to a recording component 121, 122 through 126. Components 123—125 and their connections to styli 93—95 are not shown. The recording components 121—126 include transformers corresponding to transformers 1 and 2 in Figure 1, and triodes corresponding to 20 and 21 in Figure 1, and their associated circuits. Detonating circuit 120 is connected to each of the recording circuits 121—126.

In Figure 4, the recording paper 59 is moved by the motor 62 as in Figures 1 and 2. In Figure 4, however, over the paper 59 there is provided an insulating member 81 having a long slot 82 therein and a scale 83 thereon. Arranged for movable adjustment in slot 82, there are a plurality of styli 91—96. The backing member 85 in Figure 4 to which the current flows through the paper 59 from the styli 91—96 placed under the paper 59, is elongated and stretches along the entire length of the slot 82.

There is also provided in Figure 4, preferably at one end of the slot 82, a timing stylus 97 which may be permanently fixed. Timing stylus 97 is connected to a timing circuit 80 which provides spaced marking pulses to provide spaced timing marks 84 on paper 59. The timing circuit 80 may employ a tuning fork or an electronic pulse generator and is energized by a switch 86.

In the use of the apparatus shown in Figure 4, the styli 91—96 are arranged along the slot 82, in accordance with the distance that their corresponding detecting devices 111—116 are separated from the explosive charge 30. When the detonating device 30 is fired, marks 101—106 are drawn on the paper 59. Each of these marks terminate as the sonic wave arrives at the corresponding detecting device of the group 111—116. The timing circuit 80 provides a linear timing scale.

Figure 5:
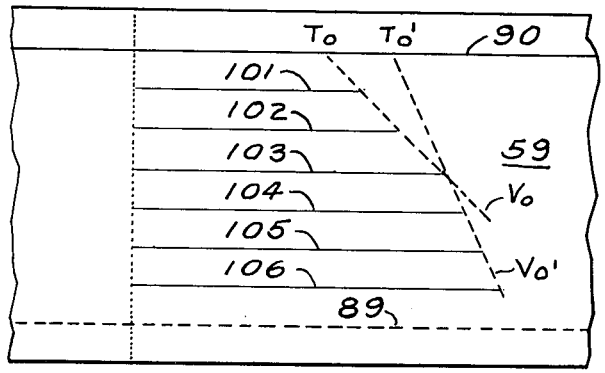
Figure 5 is a plan view of a chart produced by the apparatus shown in Figure 4.

The record provided by the apparatus in Figure 4 is shown in Figure 5, where 59 indicates the paper and the marks 101—106 are indicative of the transit times of the sonic wave to the corresponding detecting devices 111—116. By connecting the ends of the time interval lines, a velocity function curve $V_0$ is obtained for medium A in Figure 4 and another curve $V_0'$ for medium B. The slope of these lines $V_0$ and $V_0'$ is inversely proportional to the apparent velocities. The intercepts $T_0$ and $T_0'$ on the base or zero line permit a direct evaluation of the thickness and depth of the medium A in Figure 4. Simple tables and transparent celluloid scales ruled for these charts suffice for making the above evaluations in a few minutes from the automatically recorded data.

It will be understood that the timing sequence for Figure 4 may be controlled by a master timing device such as was described in connection with Figure 1, and that, in such case, the switch 86 of the timing circuit 80 could be arranged to operate substantially in synchronism with the operation of motor 62 moving strip 59. Similarly, it will be understood that a timing circuit such as component 80 of Figure 4 may be used with the devices shown in Figures 1 and 2, and operated by the master timing device, if desired.

It will be apparent to those skilled in the art that the above described invention discloses a relatively simple and inexpensive recording device for easily making seismic surveys. The chart instantly provided by this apparatus needs no processing and directly gives the desired evaluation without special computing facilities.

The specific embodiments of this invention described above are exemplary only and many changes and modifications will occur to those skilled in the art within the scope of the appended claims.

What is claimed is:

1. A system for recording the time interval between two events closely connected in point of time, one of which events is the operation of a device for producing seismic vibrations and the other of which events is the reception of said vibrations at a device for detecting seismic vibrations, comprising a first transformer including primary and secondary windings, a second transformer including primary and secondary windings and two opposed independent saturation control windings, a source of alternating voltage connected to both of said primary windings, said secondary windings being connected in opposition and to an output means, two electronic discharge devices each having a cathode, plate, and control grid, one of said saturation control windings being connected to a source of electrical potential in the plate cathode circuit of one of said electronic discharge devices, the other of said saturation control windings being connected to a source of electronic potential in the plate cathode circuit of the other of said electronic discharge devices, an input means connected to the grid of each of said electronic discharge devices whereby the first of said saturation control windings saturates said second transformer upon the occurrence of one of said events and the other of said saturation control windings cancels the saturated condition of said second transformer upon the occurrence of the other of said events, said output means being connected to an electrically operated marking means, one of said input means being connected to said device for producing seismic vibrations, and the other of said input means being connected to said device for detecting said seismic vibrations.

2. A system for recording the time interval between two events closely connected in point of time, one of which events is the operation of a device for producing seismic vibrations and the other of which events is the reception of said vibrations at a device for detecting seismic vibrations, transformer means having at least one primary winding, two secondary windings, and two oppositely wound independent saturation control windings, said primary winding being connected to a source of alternating potential, said secondary windings being connected in phase opposition and to an output means, first and second electronic discharge devices, each having a cathode, plate, and control electrode, one of said saturation control windings being connected to a source of electric potential in the plate circuit of one of said electronic discharge devices, the other of said saturation control windings being connected to a source of electronic potential in the plate cathode circuit of the other of said electronic discharge devices, separate input means connected to the grid of each of said electronic discharge devices, said output means being connected to an electrically operated marking means, one of said input means being connected to said device for producing seismic vibrations, and the other of said input means being connected to said device for detecting said seismic vibrations.

3. A system for recording the time interval between two events closely connected in point of time, one of which events is the operation of a device for producing seismic vibrations and the other of which events is the reception of said vibrations at a device for detecting seismic vibrations, comprising a first transformer including primary and secondary windings, a second transformer including primary and secondary windings and two opposed independent saturation control windings, a source of alternating voltage connected to both of said primary windings, said secondary windings being connected in opposition and to an output means, a first input means connected to one of said saturation control windings and a second input means connected to the other of said saturation control windings whereby the first of said saturation control windings saturates said second transformer upon the occurrence of one of said events and the other of said saturation control windings cancels the saturated condition of said second transformer upon the occurrence of the other of said events, said output means being connected to an electrically operated marking means, one of said input means being connected to said device for producing seismic vibrations, and the other of said input means being connected to said device for detecting said seismic vibrations.

4. A system for recording the time interval between two events closely connected in point of time, one of which events is the operation of a device for producing seismic vibrations and the other of which events is the reception of said vibrations at a device for detecting seismic vibrations, transformer means having at least one primary winding, two secondary windings, and two oppositely wound independent saturation control windings, said primary winding being connected to a source of alternating potential, said secondary windings being connected in phase opposition and to an output means, a first input means connected to one of said saturation control windings and a second input means connected to the other of said saturation control windings whereby the first of said saturation control windings saturates said transformer means upon the occurrence of one of said events and the other of said saturation control windings cancels the saturated condition of said transformer means upon the occurrence of the other of said events, said output being connected to a marking means, one of said input means being connected to said device for producing seismic vibrations, and the other of said input means being connected to said device for detecting said seismic vibrations.

References Cited in the file of this patent

UNITED STATES PATENTS

| | | |
|---|---|---|
| 2,230,558 | Bowen | Feb. 4, 1941 |
| 2,260,012 | Edwards | Oct. 21, 1941 |
| 2,276,423 | Silverman | Mar. 17, 1942 |
| 2,405,397 | Bedford | Aug. 6, 1946 |
| 2,435,926 | Krupick | Feb. 10, 1948 |
| 2,440,970 | Palmer | May 4, 1948 |
| 2,576,529 | McKenney et al. | Nov. 27, 1951 |